May 18, 1965  F. J. MARINO  3,183,916
CARGO LOADING TENT
Filed Sept. 19, 1963  3 Sheets-Sheet 1
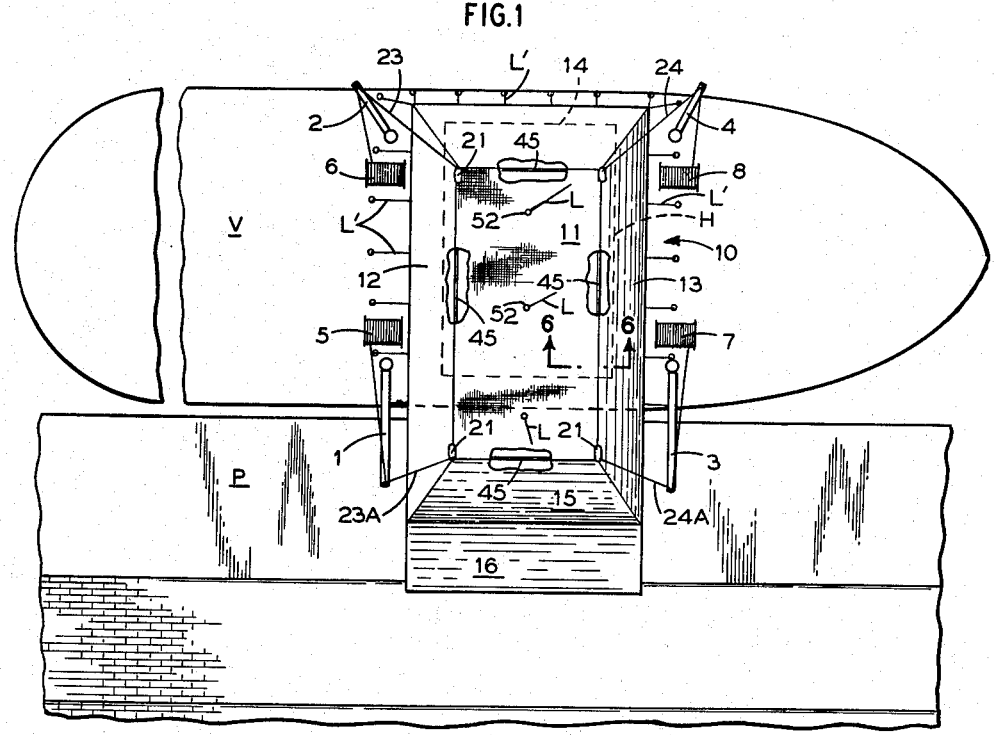
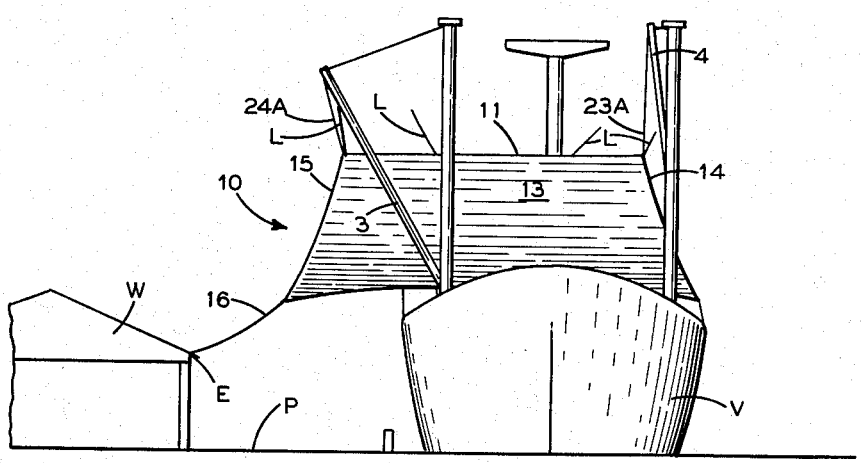
INVENTOR.
Frank J. Marino
BY
ATTORNEY

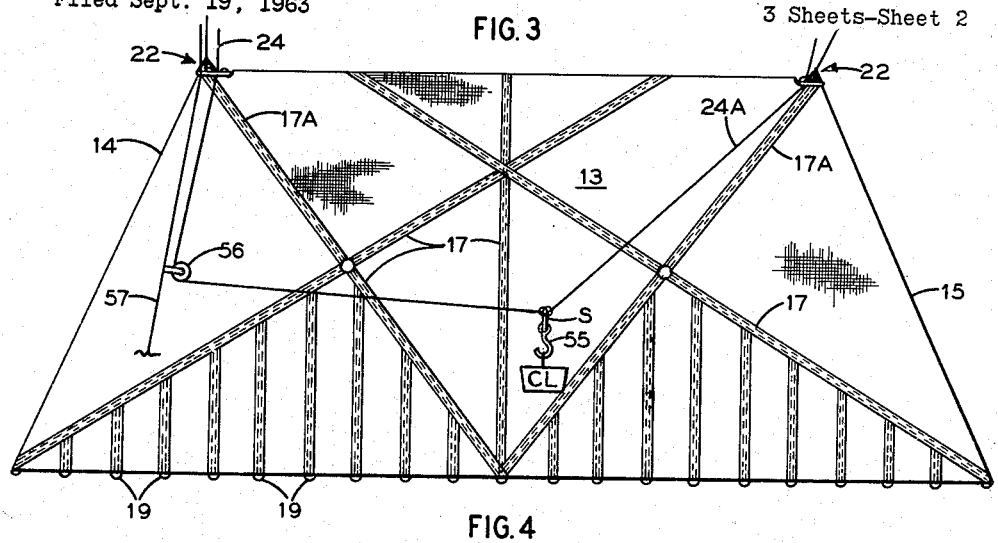
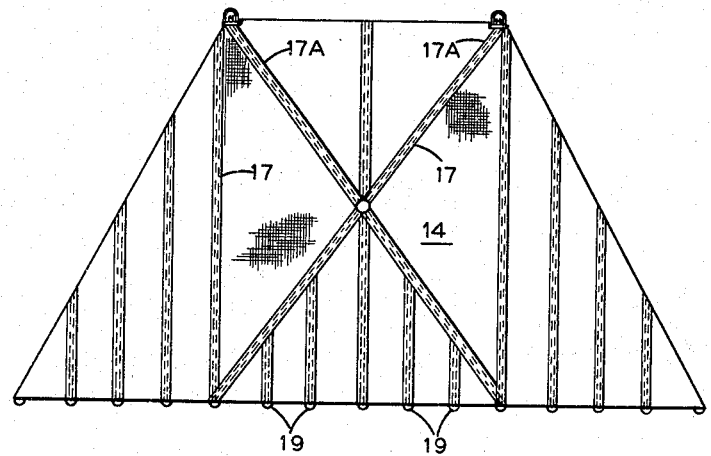
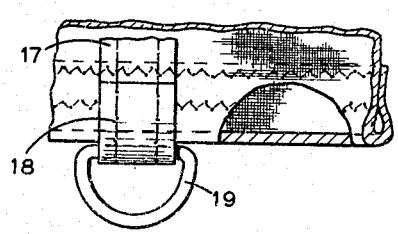
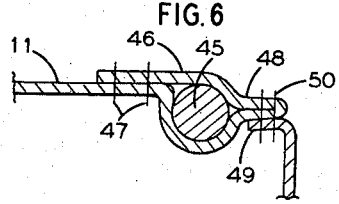

May 18, 1965 F. J. MARINO 3,183,916
CARGO LOADING TENT
Filed Sept. 19, 1963 3 Sheets-Sheet 3
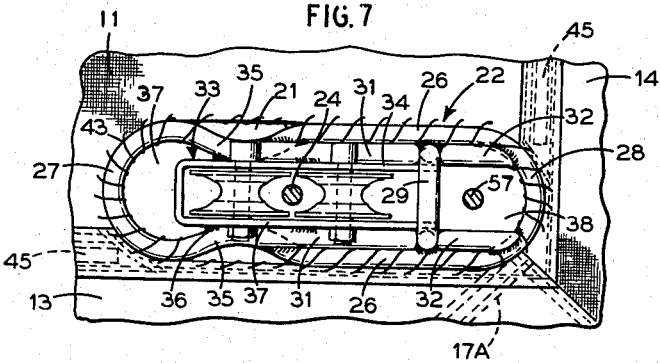
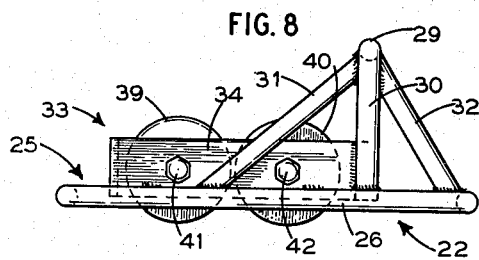
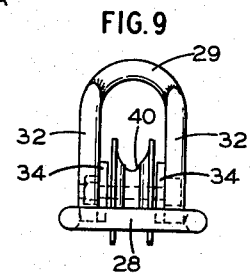
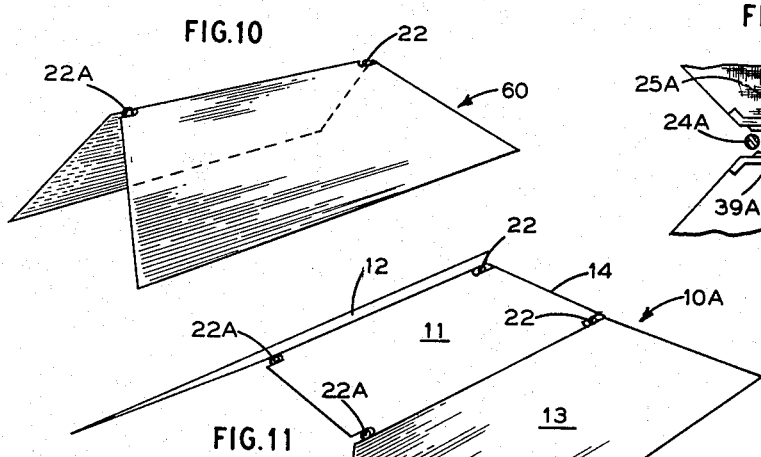
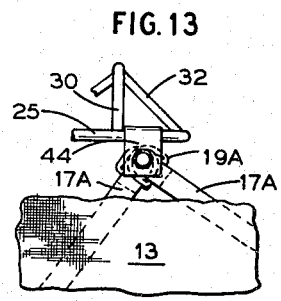

United States Patent Office 3,183,916
Patented May 18, 1965

3,183,916
CARGO LOADING TENT
Frank J. Marino, Brooklyn, N.Y., assignor to L. Marino, Inc., Brooklyn, N.Y., a corporation of New York
Filed Sept. 19, 1963, Ser. No. 310,038
6 Claims. (Cl. 135—6)

This invention relates to tents for excluding rain or snow from open cargo hatches of vessels during the loading and unloading thereof; and more particularly concerns tents for protecting vessel loading operations as they extend between the vessel and the pier.

Various tent structures have been proposed for the open hatches of vessels to protect the same from rain or snow and thereby permit continued stevedoring operations under adverse weather conditions. However, in most cases, such tents are slotted to allow for the lateral movement of the runner from the winch, which suspends the sling load and moves the same between the pier and the hatchway. With slots of extended length and a tendency of the slot edges to become displaced during the loading and unloading operations, rain leakage is necessarily substantial and the protection afforded by such tents is materially reduced. In various seaports subject to frequent and heavy rainfall, the loading and unloading of water sensitive cargo, such as coffee and the like is attended by expensive delays in the stevedoring operations, as well as substantial claims for rain damage.

Accordingly, an object of this invention is to provide an improved cargo loading tent which eliminates the usual runner slot, yet allows for full manipulation of the runners and the sling load; the leakage into the interior of the tent, even under heavy rain conditions being so slight as to be without material significance.

Another object of this invention is to provide a tent of the character described which can be extended to afford protection for the pier as well as the vessel hatch being worked; the pier end of the tent being secured in a manner to compensate for changes in the position of the vessel during stevedoring operations, due to changes in tidal conditions.

A further object of this invention is to provide for use with a cargo loading tent of the character described, improved crown members for guiding runners into the interior of the tent for engaging and shifting sling loads between the hatch and the pier.

Yet another object of this invention is to provide an improved carbon loading tent which is highly resistant to stresses and strains incident to rigging operations and actual usage; which is economical to manufacture; and which is readily and quickly rigged for use.

Still a further object of this invention is to provide a tent construction which may be made in forms suitable for use with hatches having single or double sets of booms; and may be adapted for protecting the ship hatch alone, or the ship hatch together with the adjacent pier portion.

Other objects of this invention will in part be obvious and in part hereinafter pointed out.

In the drawings, FIG. 1 is a top plan view showing a cargo loading tent embodying the invention, in rigged relation to a vessel hatchway;

FIG. 2 is a side elevational view thereof;

FIG. 3 is a side elevational view of one of the side panels of the tent, showing the interior side thereof;

FIG. 4 is an elevational view of the end panel of the tent, showing the interior side thereof;

FIG. 5 is a fragmentary view showing the reinforcing strips for the tent panels and the anchoring rings thereon;

FIG. 6 is a sectional view taken on the line 6—6 of FIG. 1;

FIG. 7 is a top plan view of the crown member portion of the tent;

FIG. 8 is a side elevational view of the crown member;

FIG. 9 is an end view thereof;

FIG. 10 is a perspective view of an alternative form of cargo loading tent;

FIG. 11 is a perspective view of another form of cargo loading tent;

FIG. 12 is a top plan view showing an alternative form of crown member; and

FIG. 13 is a partial elevational view showing the crown member in relation to the reinforcing webbings, with parts cut away.

The cargo loading tent of the instant invention essentially comprises an elongated fabric enclosure of dimensions to enclose a vessel's hatch together with the pier portion adjacent the hatch or the hatch alone; the enclosure being provided in its top portion with at least one pair of longitudinal openings of restricted extent, crown members being fitted into the openings for passing runners from a pair of winches therethrough into the interior of the enclosure, the sling load being attachable to the paired runners which are suitably manipulated by the appropriate operation of the respective winches to raise, lower and shift the sling load to and from selected positions in the vessel hold and the pier.

Thus, as shown in the drawings, 10 designates one form of a cargo loading tent embodying the invention, which for the purpose of illustration, is adapted to enclose a hatchway H of a vessel V which is disposed along a pier portion P; the tent also enclosing the pier portion P. The hatchway H is of a size such that two sets of booms 1, 2; 3, 4 and two sets of winches 5, 6; 7, 8 are used to work the same.

The tent 10 is formed of fabric panels, as of nylon or the like and comprises a rectangular top panel 11, a pair of similar rhomboidal side panels 12, 13, a rhomboidal back panel 14 and a rhomboidal front panel 15 which has a flap panel 16 extending from its lower edge. The several panels are secured together at their complementary edges by stitching or the like. The panels are reinforced by 1¾" wide webbing strips 17 of high breaking strength nylon; such strips 17 extending between edges of panels 12–16.

The webbing strips 17 which terminate at the bottom edges of side panels 12, 13; back panel 14 and flap panel 16, have their terminal end portions doubled back as at 18 and stitched down, with D rings 19 being mounted in the loops formed thereby. The D rings 19 provide means for anchoring the bottom portions of tent 10 when the same is suitably rigged and suspended from booms 1–4 over hatchway H.

The tent panels 11–16 are imperforate except for short elongated openings 21 at the corner portions of top panel 11 in which openings crown runner guide members 22 are mounted for passing paired runners 23, 23A and 24, 24A from the respective winches 5–8 into the interior of the tent. Such runners pass through suitable blocks, not shown, which are mounted on the outer ends of booms 1–4.

The crown members 22 comprise a frame 25 formed of bar stock suitably bent to provide opposed side portions 26 connected at their opposite ends by arcuate end portions 27, 28. Suspending means is provided for the crown members 22 in the form of inverted U-shaped members 29 disposed in an upstanding position with the lower ends of the arms 30 thereof welded to side portions 26 at points intermediate the ends thereof. Reinforcing struts 31, 32 extend angularly between the upper ends of arms 30 to longitudinally spaced points on side portions 26 and are welded in place.

A U-shaped pulley mounting member 33 of bent sheet metal is located between the side portions 26 with its arms 34 welded at their outer ends to the arms 30 of member 29, and also welded to inwardly pinched portions 35 of frame side portions as at 36. The suspending member 29 is located in spaced relation to arcuate end portion 28 of frame 25 to provide a space 38 therebetween for the purpose hereinafter appearing.

A pair of guide pulleys 39, 40 are journalled in adjacent relation to each other on arms 34 of the mounting member 33; their pulley axes 41, 42 being in parallel relation. The runners 23, 23A; 24, 24A from the winches pass through blocks, not shown, on the booms 1–4, and then pass inwardly into tent 10 by way of the crown members 22 and through the guide pulleys 39, 40 thereof.

The crown members 22 mounted in openings 21 of the tent 10, are held in place by lashings 43 engaging frames 25. In addition, webbing strips 17A which converge at their upper ends at openings 21, are looped at their terminal ends with D rings 19A engaged in the looped ends. Superposed D rings 19A are secured to frame 25 by shackles 44, see FIG. 13. Further, the tent top panel 11 is reinforced by cables 45 which extend about the periphery thereof and are received in turned back marginal portions 46 of said panel. The turned back portions 46 are secured in place by stitching 47 and are nipped at their outer edges as at 48. Inturned top edge portions 49 af panels 12–15 are secured to the nipped portions 48 of panel 11 by stitching 50. The terminal ends of cables 45 extend to the crown members 22 and are secured to frames 25 thereof, by shackles not shown.

It will be apparent that the crown members 22 are secured in place in openings 21 by the cables 45 and the reinforcing webbings 17A. Thus, the tent panels 11–15 are rendered highly resistant to incident stresses at the openings 21 therein.

The tent 10 is adapted to enclose large vessel hatchways, as indicated at H, where the dual sets of booms 1, 2; 3, 4 on opposite sides of said hatchways, together with associated winches 5, 6; 7, 8 operate to load and unload cargo by way of said hatchway H. The tent 10 is suspended over the hatchway H by means of the booms 1–4 which are set in their proper angular positions, in a conventional manner and the usual rigging lines indicated at L. Lines L at their outer ends engage the suspending members 29 of the crowns 22. In addition, suspension rings 52 mounted on central portions of top panel 11 provide further means for engagement by additional rigging lines L from the booms 1–4.

The side panels 12, 13 and back panel 14 are stretched and held taut by D rings 19 along the bottom edges thereof which provide means for securing rigging lines L′ extending to the deck of vessel V. Additional D rings 19 may be mounted on central portions of tent panels 12–14 for rigging lines L′ which also are anchored on the vessel deck to insure tautness of the tent panels.

The front flap panel 16 is also provided with webbing strips 17 to reinforce the same, as previously described; said strips 17 terminating in loops for mounting D rings 19 along the bottom edge of said flap panel. Lines L′ extend from said rings 19 to fixed structure on pier portion P, as the eave portion of the warehouse structure W, as at E. Thus, the flap panel 16 will automatically compensate for the movements of vessel V during stevedoring operations, due to tidal effects.

The paired runners 24, 24A from winches 8, 7 pass through suitable blocks on the respective booms 1, 2 and thence by way of the guide pulleys 39, 40 in crown members 22, into the interior of tent 10. The terminal ends of said runners 24, 24A are interconnected in a conventional manner to a sling line S which carries the usual sling hook 55 for engaging the cargo load CL which is to be passed between the pier P and the hold of vessel V by way of hatchway H.

It will be apparent that by appropriate operation of the winches 5, 6 to take in or pay out the paired runners 24, 24A, the cargo load CL is raised, shifted and lowered as desired. All movements of the cargo load CL take place beneath the tent 10 so as to protect the same from rain which is totally excluded from the interior of the tent 10 except at the very small openings in the crown members 22. Even this small leakage factor may be further reduced, by the use of waterproof cap members, not shown, disposed over the crown members 22 and provided with gasketed openings to pass the runners 24, 24A.

Means is provided for locating the upper run portions of the runners 23, 24 within the tent 10 to facilitate the movements of said runners, and further, to avoid the transmission of excessive stresses due to load CL, to the crown members 22 and the tent panels. To this end, a block 56 is located beneath each of the rear openings 21 of tent 10. The blocks 56 are fixed to a cable 57 at an intermediate point thereof. The upper end portion of cable 57 passes outwardly of crown member 22 by way of the space 38 between the suspending member 29 and frame end 28, FIG. 7, then through a block, not shown, on boom 4 and then downwardly to the vessel deck where the terminal end thereof is secured to a cleat located exteriorly of tent 10. The lower end of cable 57 is also secured to a cleat on the vessel deck, but interiorly of tent 10. The total length of cable 57 is sufficient to allow block 56 to be located in positions below crown member 22 at selected distances therefrom, the opposite ends of said cable then being secured to the respective cleats to anchor the block 56 in its selected position.

The rear runner 24 now passes from the crown member 22 through block 56 and thence to sling line S to join the front runner 24A. Thus, block 56 may be shifted to various positions relative to crown member 22 to suit particular stevedoring operations, and furthermore, is effective to relieve crown member 22 of excessive strains arising from the angular shift of the runner 24 as it passes through the guide pulleys 39, 40 on the crown member 22. This in turn relieves the tent panels from excessive transmitted stresses to reduce possibilities of damage.

A similar block 56 and suspending cable 57 is associated with the other rear runner 23 and used in the same manner. Tent 10 may be reduced in size for smaller hatchways worked with a single set of booms and winches and thus requiring only a single set of crown members 22. Also, the front panel 15 and flap panel 16 may be omitted when the tent is foreshortened to provide protection for the vessel hatchway H only.

While the invention is shown with flat top tents, it is understood that crown members 22 may be used with ridge type, peak tents 60, as shown in FIG. 10. Also, with tent 60 omitting a front panel, the front crown member 22A may be of a modified construction, shown in FIG. 12. Crown member 22A includes a frame 25A of bent bar stock which is open at its forward end and has a pulley frame 33A fixed therein to carry a single guide pulley 39A. A suspension member 29A is fixed to the frame 25A forwardly of the rear arcuate portion 27A thereof.

In this case, the forward runner 24A passes directly into engagement with guide pulley 39A; while the rear runner 24 passes through crown member 22 as previously described. Also, as shown in FIG. 11, the combination of crown members 22, 22A may be used with a flat top tent 10A; the open front crown members 22A again being located at the front open end of the tent and the crown members 22 previously described, being located at the rear of said tent.

As various changes might be made in the embodiments of the invention herein disclosed, without departing from the spirit thereof, it is understood that all matter herein shown or described shall be deemed illustrative and not by way of limitation except as set forth in the appended claims.

What is claimed is:

1. For use with at least one pair of loading booms of a vessel which are movable to selected angular positions relative to the deck of said vessel and at least one pair of runners extending from the respective booms, a cargo loading tent for suspension over a hatchway of said vessel, said tent comprising a top portion and side portions extending from said top portion, the top portion of said tent being formed with at least one pair of longitudinally spaced small crown receiving openings, a crown member in each opening and substantially filling said opening to limit the ingress of rain into said tent, means for securely mounting said crown members in the respective crown receiving openings, said crown members including means for independently suspending said tent from said booms to locate the crown members in the top portion of said tent in selected positions spaced from the respective booms while said booms are in selected angular positions thereof, each of said crown members further including a pair of pulley means mounted thereon for guiding one of said runners into the interior of said tent whereby the terminal ends of said runners are adapted to be interconnected and connected to a sling load for maneuvering said sling load in response to regulated movement of said runners through the pulley means of said crown members.

2. A tent as in claim 1 wherein said tent includes a front panel portion adapted to be disposed over a pier, and a flap extending from the bottom edge of said front panel portion, said flap being adapted to be secured to fixed means on said pier to accommodate the tidal rise and fall of said vessel at said pier.

3. A cargo loading tent for suspension on the booms of a vessel to locate said tent over the hatchway of said vessel, said tent comprising a top panel portion having a pair of longitudinally spaced small crown receiving openings therein for passing runners moving from said booms into the interior of said tent, a crown member mounted in each of said openings, each crown member including suspension means for independently suspending said tent from said booms, each crown member further including guide means for passing a runner therethrough, cable means extending from one of said booms, means on one of said crown members for passing said cable means therethrough, guide block means fixed to said cable means on a lower portion thereof, said last mentioned runner passing through said guide block means, said cable means being movable to adjusted positions whereby to adjustably locate said guide block means and to thereby control the angular displacement of said last mentioned runner.

4. For use with a vessel hatchway provided with a pair of spaced booms on either side thereof, said booms being movable to adjusted angular positions relative to the vessel deck for working said hatchway by runners extending through blocks on each of said booms, a cargo loading tent for suspension over said hatchway, said tent having a flat, substantially rectangular top panel with side and back panels extending from said top panel, a small runner opening in each of the corners of said top panel, a crown member mounted in each of said runner openings and substantially filling said opening to limit the ingress of rain into said tent, runner guide means on each of said crown members, means on each crown member for suspending said tent from said booms in adjusted spaced relation to the blocks of said booms to locate the top panel of said tent at selected distances from said hatchway, the runners from each of said pairs of booms passing respectively through the guide means of the crown members associated with the respective pairs of booms and into the interior of said tent whereby said hatchway may be independently worked on either side thereof by the interengaged ends of the respective pairs of runners.

5. A cargo loading tent as in claim 4 and further including a front panel extending from said top panel, the forward portion of said tent projecting beyond said vessel hatchway and over a pier at which the vessel is located, and a flap extending from the bottom edge of said front panel for attachment to fixed means on said pier to accommodate the tidal rise and fall of the vessel at the pier.

6. A cargo loading tent as in claim 4 and further including webbing reinforcing strips on said side and back panels, at least some of said reinforcing strips extending to said runner openings, means for securing end portions of said strips to the crown members in said runner openings, cable reinforcement means extending about the periphery of said top panel, and means for securing end portions of said cable means to the crown members in said runner openings.

References Cited by the Examiner

UNITED STATES PATENTS

| | | | |
|---|---|---|---|
| 298,241 | 5/84 | Schneider et al. | 254—190 |
| 522,524 | 7/94 | Hook | 254—190 |
| 524,137 | 8/94 | Enright | 135—6 |
| 1,640,188 | 8/27 | Grunbock | 135—6 |
| 1,768,894 | 7/30 | Dubervil | 254—190 |
| 2,163,072 | 6/39 | Spelman | 135—6 |
| 2,201,781 | 5/40 | MacGeorge | 135—6 |
| 2,252,018 | 8/41 | McHugh | 135—6 |
| 2,316,727 | 4/43 | Thompson | 254—190 |
| 2,849,010 | 8/58 | Marino | 135—6 |

FOREIGN PATENTS 721,966  1/55  Great Britain.

HARRISON R. MOSELEY, *Primary Examiner.*